United States Patent [19]

Grant et al.

[11] Patent Number: 6,011,086
[45] Date of Patent: *Jan. 4, 2000

[54] MIXTURE OF SORBITAN ESTER, MAGNESIUM HYDROXIDE AND THERMOPLASTIC RESIN

[75] Inventors: Lawrence P. Grant, Danvers; Susan Crooks, Salisbury; Robert P. Edmonston, Wayland, all of Mass.

[73] Assignee: Morton International, Inc., Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/825,084

[22] Filed: Mar. 27, 1997

Related U.S. Application Data

[63] Continuation of application No. 08/281,877, Jul. 28, 1994, abandoned.

[51] Int. Cl.[7] .................................................. G08K 9/00
[52] U.S. Cl. ........................ 523/200; 524/111; 524/315; 524/317; 524/318; 524/320; 524/322; 523/205
[58] Field of Search .................................... 524/318, 322, 524/317, 315, 111, 320; 523/200, 204, 205

[56] References Cited

U.S. PATENT DOCUMENTS

| | | | |
|---|---|---|---|
| 4,126,593 | 11/1978 | Takahashi | 260/23 R |
| 4,396,730 | 8/1983 | Imahashi | 523/200 |
| 5,212,222 | 5/1993 | Mitsuuchi et al. | 524/230 |
| 5,317,051 | 5/1994 | Harashige et al. | 524/310 |

*Primary Examiner*—Judy M. Reddick
*Attorney, Agent, or Firm*—Robert M. Didrick; Gerald K. White

[57] ABSTRACT

A thermoplastic resin containing a flame-retarding magnesium hydroxide has its workability enhanced by a sorbitan ester in admixture with the resin and flame retardant. An admixture of the resin, magnesium hydroxide, and ester may be either a mixture of discrete particles of each of said components of the composition or a mixture of the resin and a magnesium hydroxide powder whose particles have a coating of the ester.

12 Claims, No Drawings

MIXTURE OF SORBITAN ESTER, MAGNESIUM HYDROXIDE AND THERMOPLASTIC RESIN

This is a continuation of co-pending applation Ser. No. 08/281,877 filed on Jul. 28, 1994 now abandoned.

BACKGROUND OF THE INVENTION

The present invention relates to a novel inorganic filler and to a thermoplastic resin filled with it. More particularly, this invention relates to a powdery magnesium hydroxide having a sorbitan ester coating as a flame retardant filler for thermoplastic resins.

To overcome the poor affinity of hydrophilic inorganic fillers to oleophilic resins, the art has coated the surface of the fillers with fatty acids and metal salts thereof but these agents have low softening points and their covering power is seriously reduced at the high temperatures sometimes imposed on the resins in use. Takahashi, in U.S. Pat. No. 4,126,593, shows that various problems encountered with the fatty acid and metal salt coatings can be solved by using a fatty acid ester of a polyhydric glycol as the coating for the filler. One of the problems was that when inorganic hydroxides are used in an amount sufficient to impart flame retardancy, the flow properties of the filled resin are impaired so that the workability of the resin in molding and extruding operations suffers. Other problems often arising from the coating of the fillers with fatty acid esters are the dulling of the filler's patina, thence that of the filled resin, and an undesirable color imparted to the filler and to the resin.

By use of the sorbitan ester coated magnesium hydroxide of this invention in a thermoplastic resin, the fire retardancy of the resin is improved while retaining good practical moldability without imperfections in appearance such as the occurrence of flashes on the surface of the molded article and without a substantial deterioration of the resin's mechanical properties such as impact strength. The workability, gloss, and color of the filled, flame retarded resins of the present invention is improved. Furthermore, the weight of the coating may be reduced considerably in comparison with coatings of the prior art. This reduction in weight makes the flame retardant more economical. Smoke suppression, often required by regulatory bodies, is afforded by the coated magnesium hydroxide of this invention and the effect is enhanced somewhat by the lesser amount of organic material being added to the total.

SUMMARY OF THE INVENTION

It is an object of this invention, therefore, to provide a thermoplastic resin containing a flame-retarding magnesium hydroxide and having its workability enhanced by a sorbitan ester in admixture with the resin and flame retardant.

It is another object of this invention to provide a coated magnesium hydroxide which can be incorporated in a large amount as a flame-retardant filler in a thermoplastic resin to afford a resin having improved workability.

It is another object of this invention to provide a flame retarded resin having an improved gloss.

It is another object of this invention to provide a flame retarded resin having improved color.

These and other objects of this invention which will become apparent from the following description are achieved by a composition comprising an admixture of a thermoplastic resin and at least about 25 phr of a magnesium hydroxide powder, and an ester of sorbitan and an aliphatic acid having from 12 to 24 carbon atoms.

DETAILED DESCRIPTION OF THE INVENTION

For the purposes of this invention, an admixture of the resin, magnesium hydroxide, and ester means both a mixture of discrete particles of each of said components of the composition and a mixture of the resin and a magnesium hydroxide powder whose particles have a coating of the ester.

Any magnesium hydroxide, such as that sold under the trademark VERSAMAG, will be suitable as an inorganic filler in the compositions of this invention when coated with the sorbitan ester. Generally, the particles of the uncoated material will be on the order of about 5 microns or less. The VERSAMAG UF material, for example, has a particle size distribution such that the diameter of 90% by weight thereof is less than $4.4\mu$, the diameter of 50% by weight is less than $1.8\mu$, and the diameter of 10% is less than $0.6\mu$. Its surface area is 15 m$^2$/gram. Its X-ray diffraction pattern shows a crystallite size of 311 Å in the <101> direction, a strain of $2.4\times10^{-3}$ in the <101> direction, a crystallite size of 243 Å in the <202> direction and a strain of $1.7\times10^{-3}$ in the <202> direction. It is known, however, that the crystalline structure of the magnesium hydroxide-plays a significant role in its effects on the workability of the resin composition in which it acts as a flame retarding filler. The magnesium hydroxide taught in U.S. Pat. No. 4,098,762 (owned by Kyowa) is among those preferred for use in this invention. It is described there as having a strain in the <101> direction of not more than $3.0\times10^{-3}$ and a crystallite size in the <101> direction of more than 800 Å, and a specific surface area of less than 20 m$^2$/g as determined by the BET method.

U.S. Pat. No. 4,098,762 (Kyowa) is incorporated herein by reference. It is important, moreover, that secondary particles of the magnesium hydroxide be uniformly distributed throughout the volume of the thermoplastic resin. Said secondary particles should, therefore, be as small as possible and the particle size distribution thereof should be as narrow as possible. For those reasons, a particularly preferred magnesium hydroxide is one having a crystallite size in the <101> direction of from about 600 Å to about 800 Å as measured according to the double line method described in the aforementioned Kyowa patent. Said particularly preferred material has an aspect ratio in the range of from 2 to 5, a strain in the <101> direction less than $3\times10^{-3}$. Even though half of the secondary particles in this particularly preferred magnesium hydroxide have diameters smaller than 1.4 $\mu$m and none of them have diameters greater than 4.0 $\mu$m, the specific surface of this magnesium hydroxide is less than 25 m$_2$/g.

The sorbitan ester of the $C_{12}$–$C_{24}$ aliphatic acid may be the mono-, di-, or triester or a mixture of two or more of them and the acid moiety may be linear or branched or a mixture of both. Such acids are exemplified by lauric, myristic, palmitic, stearic, isostearic, arachidic, behenic, lignoceric, palmitoleic, oleic, linoleic, eleostearic, and erucic acids and mixtures of two or more of them. Esters of saturated fatty acids having an even number of carbon atoms are preferred and among these, the acids having from 14 to 18 carbon atoms are particularly preferred. Examples of the sorbitan esters for this invention therefore include sorbitan monostearate, sorbitan tristearate, sorbitan monopalmitate, sorbitan tripalmitate, sorbitan oleate, sorbitan monoisostearate, and mixtures thereof. Preferably, the ester will have a hydrophilic/lipophilic balance (HLB) of from about 3 to about 20, more preferably about 12 or less. The preparation of these esters may be achieved by well known conventional techniques.

Commercially available surfactants are sources of many of the suitable esters. A particularly preferred ester is a sorbitan monostearate sold under the trademark SPAN 60 by Ruger Chemical Co. and the sorbitan monostearate sold under the trademark S-MAZ-60 by the Mazer Chemicals Division of PPG Chemicals Group. Since sorbitan is the cyclic ether-anhydride of sorbitol, minor amounts of the corresponding sorbitol ester may be present along with the sorbitan ester in the coating esters of this invention.

Coating of the magnesium hydroxide with the sorbitan ester may be accomplished by a non-aqueous process wherein a substantially dry magnesium hydroxide is agitated in a high intensity mixer such as a Henschel mixer whereby the high shear causes the internal temperature of the hydroxide to rise to about 140° F. The sorbitan ester is then added to the swirling magnesium hydroxide and the agitation is continued for a period of time sufficient to raise the internal temperature to at least about 180° F. The temperature may be as high as about 200° F. The coated hydroxide is cooled before being discharged from the mixer. To avoid complications arising from the condensation of moisture in the cooler regions of the mixer during the heating process, the magnesium hydroxide is preferably substantially dry, i.e, not more than about 0.5% by weight of adsorbed water. On the other hand, the coating can be performed by contacting the magnesium hydroxide powder with a heated aqueous suspension of the sorbitan ester with sufficiently vigorous agitation that intimate contact is achieved. The treated powder is then dried. The temperature should be such that the crystalline structure of the preferred magnesium hydroxide is not altered to a less desirable shape and/or size. The ester may also be applied by mixing the magnesium hydroxide with a solution of the ester in an appropriate solvent and then driving off the solvent. The weight of the sorbitan ester coating on the magnesium hydroxide may be from about 0.5.% to about 5% of the weight of the coated hydroxide.

Examples of the thermoplastic resin whose workability is improved by the coated magnesium hydroxide of this invention include olefin resins such as homo- or co-polymers of $C_2$-$C_8$ α-olefins, styrene resins such as homo- or copolymers of styrene and α-methylstyrene, polyester resins, polycarbonate resins, polysulfones, polyphenylene oxide resins, polyethylene terephthalate, polybutylene terephthalate, nylon resins, vinyl resins, acrylic resins, acetal resins, and blends of said resins. Polyolefin resins such as high density polyethylene, linear low density polyethylene, polypropylene, polybutene-1, copolymers of ethylene, propylene, butene-1 with each other and with other monomers such as dienes, vinyl chloride, and vinyl acetate further exemplify the thermoplastic resins which are suitable in this invention. A copolymer of ethylene and vinyl acetate is particularly amenable to treatment with the combination of magnesium hydroxide and a sorbitan ester. Polystyrene, polyacrylonitrile and copolymers of styrene and acrylonitrile such as ABS resin and AS resin are also suitable. Vinyl chloride resins including homopolymers and copolymers such as poly(vinyl chloride), poly(vinyl chloride/vinylidene chloride), poly(vinyl chloride/vinyl fluoride), poly (vinylidene chloride/vinylidene fluoride) are further examples of suitable resins in this invention. Hydrophobic resins and non-polar resins are preferred.

Incorporation of the coated magnesium hydroxide of this invention into the thermoplastic resin may be carried out by a conventional kneading method wherein, for example, a conventional roll mixer, a Banbury mixer, or biaxial extruder is used. The amount of the coated magnesium hydroxide in the resin composition of this invention may be from the minimum of about 25 phr recited above to about 250 phr by weight. Preferably, the composition will contain from about 50, more preferably from about 100, to about 120 phr of the coated magnesium hydroxide; in the more preferred compositions comprising the thermoplastic resin and coated magnesium hydroxide, therefore, the coated magnesium hydroxide will constitute from about 50% to about 55% of the total weight of the filled resin.

As mentioned above, it is not necessary to coat the magnesium hydroxide with the sorbitan ester before mixing it with the resin. The advantages of the sorbitan ester may be obtained by merely mixing the magnesium hydroxide with the ester and the resin.

The preparation of a magnesium hydroxide for use in the composition of this invention is exemplified by the following procedure.

EXAMPLE A

Magnesium oxide (MagChem 10–325; Martin-Marietta) was added to an aqueous solution of magnesium acetate (0.1M) in sufficient amount to make a 10% solids suspension along with an anionic surfactant as a filter aid. After heating and stirring the suspension at 90° C. for 5 hours, the resulting magnesium hydroxide was filtered from the liquid and washed to remove residual magnesium acetate and surfactant.

The following examples illustrate the preparation and use of the coated magnesium hydroxide more specifically. They are given to further illustrate the invention but not by way of limitation as to the subject matter of the invention. All parts are by weight unless otherwise stated.

EXAMPLE 1

The washed solids from Example A were coated with a sorbitan monostearate (SPAN 60) by stirring them into a 2% by weight aqueous suspension of the ester and filtering them and drying them.

EXAMPLE 2

A magnesium hydroxide was made according to the procedure of Example A except that the filtering and washing steps were omitted, and was coated according to the procedure of Example 1. The particle size distribution of the product was: 90% [ 2.8μ, 50% [ 1.45μ, and 10% [ 1.4μ, by weight. Its surface area was 9.1 m²/gm and its X-ray diffraction pattern shows a crystallite size in the <101> direction of 730 Å, a strain the <101> direction of 2.1×10–3, a crystallite size in the <202> direction of 783 Å, and a strain in the <202> direction of 1.2×10–3.

EXAMPLES 3–6

Magnesium hydroxide (Versamag technical grade) and sorbitan monostearate (S-Maz 60) were mixed at low to medium speed in a mini-sized Henschel mixer until the temperature exceeded 150° F. The proportions of each are given in Table I.

TABLE I

| Ex. | Mg(OH)$_2$ | Ester |
|---|---|---|
| 3 | 97.5 | 2.5 |
| 4 | 96.25 | 3.75 |
| 5 | 95.0 | 5.0 |
| 6 | 92.5 | 7.5 |

EXAMPLES 7–10

The coated products of Examples 3–6 and an uncoated Versamag magnesium hydroxide (Control) were incorporated into polyethylene resin (Union Carbide DFDA 1138 PE) in a Haake rheometer at 300° F. and a speed of 60 rpm for 30 minutes. The ratio of the filler and resin was 52.2/47.8. The equilibrium torque and the equilibrium temperature generated during the mixing are given in Table II, in which the filled resin example numbers correlate with the coated filler example numbers.

TABLE II

| Ex. | Torque (meter-gms) | Temperature ° F. |
|---|---|---|
| 7 | 1880 | 384 |
| 8 | 1706 | 359 |
| 9 | 1673 | 354 |
| 10 | 1620 | 356 |
| Control | 2453 | 384 |

EXAMPLE 11

VERSAMAG UF magnesium hydroxide (144 parts) was mixed in a mini-Henschel mixer with 6 parts of sorbitan monostearate (S-Maz 60) at low speed until the temperature rose to 180° F. The coated magnesium hydroxide (33.93 parts) was then incorporated into 31.07 parts of polyethylene in a Haake rheometer wherein the initial bowl temperature was 300° F. at a speed of 60 rpm for 30 minutes. Good mixing was observed. The equilibrium torque was 1660 meter-grams and the equilibrium temperature was 358° F. Poor mixing was observed upon incorporation of the uncoated magnesium hydroxide into the polyethylene by the same procedure; the torque was 2300 meter-grams and the temperature was 383° F.

EXAMPLE 12

The procedure of Example 11 was repeated except that half of the sorbitan monostearate was replaced by isostearic acid. Good mixing occurred when the coated powder was incorporated into the polyethylene. The torque was 1650 meter-grams and the temperature was 359° F.

EXAMPLE 13

Brucite, a natural magnesium hydroxide, was coated with SPAN 60 sorbitan monostearate according to the general procedure of Example 11 to a coating weight of 4% of the total weight. When this was mixed into the polyethylene in the Haake rheometer as in Example 11, the torque was 1387 and the temperature was 345° F.

EXAMPLE 14

The procedure of Example 2 was repeated to produce a filler whereon the coating weighed 4% of the total weight. Sixty five (65) parts of a mixture of the thus coated magnesium hydroxide and polyethylene (weight ratio: 52:48) were mixed for 30 minutes in a Haake rheometer wherein the initial bowl temperature was 300° F. and the rotor speed was 60 rpm.

EXAMPLE 15

Magnesium hydroxide sold under the trademark DUHOR N by Duslo s.p. of the Slovak Republic was coated according to the aqueous procedure of Example 1 to give a coated filler whereon the coating weighed 4% of the total weight. The uncoated powder had a particle size distribution such that 50% by weight of the particles was less than or equal to 1.05$\mu$ and an average crystallite size in the <101> plane of 615 Å (as measured by the Kyowa patent double line procedure). Its specific surface area was 8.3 m$^2$/g.

EXAMPLE 16

Another sample of the magnesium hydroxide described in Example 15 was coated according to the aqueous procedure of Example 1 to give a coated filler whereon the coating weighed 2% of the total weight.

EXAMPLE 17

Magnesium hydroxide sold under the trademark DUHOR P by Duslo s.p. was coated according to the aqueous procedure of Example 1 to give a coated filler whereon the coating weighed 4% of the total weight. The uncoated powder had a particle size distribution such that 50% by weight of the particles was less than or equal to 0.95$\mu$ and an average crystallite size in the <101> plane of 686 Å the Kyowa patent double line procedure).

EXAMPLES 18–21 and Comparative Example 1

The coated fillers of Examples 14–17 and the corresponding uncoated fillers (Controls) were mixed with polyethylene to give mixtures wherein the filler to polyethylene weight ratio was 52:48. In Comparative Example 1, the KISUMA 5AN coated magnesium hydroxide sold by Kyowa (the uncoated material is described in the aforementioned Kyowa patent) was mixed with the polyethylene in the same ratio. Sixty five (65) parts of each mixture was mixed for 30 minutes in a Haake rheometer wherein the initial bowl temperature was 300° F. and the rotor speed was 60 rpm. The equilibrium torque and equilibrium temperature generated during the mixing are shown in TABLE III. For comparison, when the same amount of unfilled polyethylene was subjected to the same rheometer conditions, the equilibrium que was 1580 MG and the equilibrium temperature was 352° F.

TABLE III

| Ex. No. | Equilibrium Torque (meter grams) | Equilibrium Temp. (° F.) |
|---|---|---|
| 14 | 1250 | 343 |
| 15 | 1070 | 343 |
| 16 | 1320 | 352 |
| Control for 15 and 16 | 2120 | 377 |
| 17 | 1140 | 345 |
| Control for 17 | 2190 | 379 |
| Comp. Ex. 1 | 1270 | 347 |

EXAMPLE 22

VERSAMAG UF magnesium hydroxide was stirred in a Henschel mixer until the temperature rose to 180° F. and a sufficient amount of sorbitan monostearate (SPAN 60) was added to the hot powder to give a coating weight of 4% of the total. The coated magnesium hydroxide and polyethylene were then milled together to form a film containing 52% of the filler and 48% of the resin by weight. The tensile strength of the film was 1385 pounds per square inch (psi) and its elongation was 725% as measured according to ASTM D-638 on an Instron machine having a load cell of 100 kg at a cross head speed of 500 mm/min and a chart speed of 100 mm/min. The values for the unfilled polyethylene were 2100 psi and 850%. An ASTM D412C die was used to cut the sample.

EXAMPLE 23

DUHOR N magnesium hydroxide was mixed thoroughly with 2% of its weight of dry, powdered SPAN 60 ester and then this mixture was mixed with polyethylene (Union Carbide DFDA 1138 PE) at a ratio of magnesium hydroxide/SPAN 60/polyethylene equal to 50:2:48 by weight in a Haake rheometer at 300° F. and a speed of 60 rpm for 30 minutes.

EXAMPLE 24

A mixture of VERSAMAG UF magnesium hydroxide/SPAN 60/polyethylene ester having a weight ratio of 48:4:48 was prepared by first mixing the magnesium hydroxide thoroughly with 4% of its weight of dry, powdered SPAN 60 ester at room temperature and then combining this mixture with the polyethylene (Bakelite DFDA 1138 PE) in a Haake rheometer at 300° F. and a speed of 60 rpm for 30 minutes.

EXAMPLES 25 AND 26

The procedures of Examples 23 and 24 were repeated except for the replacement of polyethylene with an ethylene/vinyl acetate copolymer containing about 28% of the vinyl acetate and sold by Dupont under its trademark ELVAX 260.

The equilibrium torque and temperature during the Haake mixing according to Examples 23–26 are shown in TABLE IV along with the values observed when resin samples containing either KISUMA 5AN magnesium hydroxide, the untreated polyethylene or EVA copolymer were put through the Haake rheometer.

TABLE IV

| Ex. No. | Torque(m-g) | Temp. (° F.) |
| --- | --- | --- |
| 23 | 1200 | 347 |
| 24 | 1700 | 356 |
| 25 | 1430 | 268 |
| 26 | 1920 | 285 |
| KISUMA 5AN/PE 52:48 | 1270 | 347 |
| KISUMA 5AN/EVA (52:48) | 1260 | 261 |
| Polyethylene | 1480 | 353 |
| EVA copolymer | 1050 | 244 |

Samples of polyethylene containing either the SPAN 60 coated DUHOR N or DUHOR P magnesium hydroxides, the corresponding untreated hydroxides, or the KISUMA 5AN hydroxide were compounded on a two-roll mill and then compression molded into plaques. In each case, the filler/resin ratio was 52:48 by weight. The tensile strength and % elongation at break of such plaques were measured according to the ASTM-D638 procedures using an ASTM—D412C die and an Instron machine in which the load cell was 100 kgs and the crosshead speed was 500 mm/min. The test results are given in TABLE V.

Smoke density evaluations of 3"×3" plaques made up of 48% resin and 52% of either the 2% SPAN 60 coated DUHOR N material, the untreated DUHOR N material, untreated DUHOR P material, or the KISUMA 5AN material were conducted in an NBS smoke chamber in which the radiometer was set at 8.89 MV, the irradiance was 2.25 w/cm$^2$, the G factor was 132. The burner fuel was 500 cc/min air and 50 cc/min propane and the thermal exposure was flaming. The maximum specific optical densities (Dm) @ the given number of minutes are also given in TABLE V.

TABLE V

| Sample | Tensile (psi) | Elongation (%) | Dm @ minutes |
| --- | --- | --- | --- |
| Duhor N | 1200 | 95 | 4 @ 9.0 |
| Duhor N 2% Span 60 | 1230 | 730 | 1 @ 7.25 |
| Duhor N 4% Span 60 | 1250 | 765 | — |
| Duhor P | 1270 | 150 | 3 @ 8.0 |
| Duhor P 4% Span 60 | 1260 | 785 | — |
| KISUMA 5AN | 1340 | 830 | 7 @ 7.0 |

The subject matter claimed is:

1. A composition comprising a mixture of particles of:

a thermoplastic resin selected from the group consisting of polyethylene, polypropylene, polycarbonate, polysulfone, polyphenylene oxide, acetal resin and co-polymers of ethylene and propylene with each other and with a diene, vinyl chloride or vinyl acetate, and a magnesium hydroxide powder coated with a sorbitan ester of an aliphatic acid having from 12 to 24 carbon atoms, said sorbitan ester being present in an amount from about 2% to about 4% by weight of the coated magnesium hydroxide.

2. The composition of claim 1 wherein the acid has 18 carbon atom.

3. The composition of claim 1 wherein the ester is a sorbitan stearate.

4. The composition of claim 1 wherein the acid is selected from a group consisting of stearic and isostearic acid.

5. The composition of claim 1 wherein the magnesium hydroxide is characterized as having a strain in the <101> direction of not more than 3.0×10$^{-3}$, a crystallite size in the <101> direction of more than 800 Å, and a specific surface area of less than 20 m$^2$/g.

6. The composition of claim 1 wherein the magnesium hydroxide is characterized as having a crystallite size in the <101> direction of from 600 Å to about 800 Å and a strain in the <101> direction less than 3×10$^{-3}$.

7. The composition of claim 6 wherein the magnesium hydroxide has an aspect ratio in the range of from 2 to 5.

8. The composition of claim 6 wherein the magnesium hydroxide comprises secondary particles, half of which have diameters smaller than 1.4 µm and none of which have diameters greater than 4.0 µm.

9. The composition of claim 6 wherein the magnesium hydroxide has a specific surface area of less than 25 m$^2$/g.

10. The composition of claim 8 wherein the magnesium hydroxide has a specific surface area of less than 25 m$^2$/g.

11. The composition of claim 6 wherein the thermoplastic resin is polyethylene or polypropylene.

12. The composition of claim 6 wherein the thermoplastic resin is a copolymer of ethylene and vinyl acetate.

* * * * *